Aug. 21, 1951 L. E. THOMPSON 2,565,409

MODULATOR CIRCUIT

Filed Aug. 24, 1949

INVENTOR
Leland E. Thompson
BY Harry Tunick
ATTORNEY

Patented Aug. 21, 1951

2,565,409

UNITED STATES PATENT OFFICE 2,565,409

MODULATOR CIRCUIT

Leland E. Thompson, Merchantville, N. J., assignor to Radio Corporation of America, a corporation of Delaware Application August 24, 1949, Serial No. 112,019

6 Claims. (Cl. 332—48)

This invention relates to a modulator circuit, and more particularly to a modulator circuit useful in double side band-suppressed carrier multichannel equipment.

An object of this invention is to devise a novel type of balanced modulator.

A still further object is to provide a balanced modulator circuit which is less expensive than those of the ordinary type.

Still another object is to devise a balanced modulator circuit by the use of which as much of the carrier frequency energy as is desired may be caused to appear in the output of such circuit.

Figure 1:
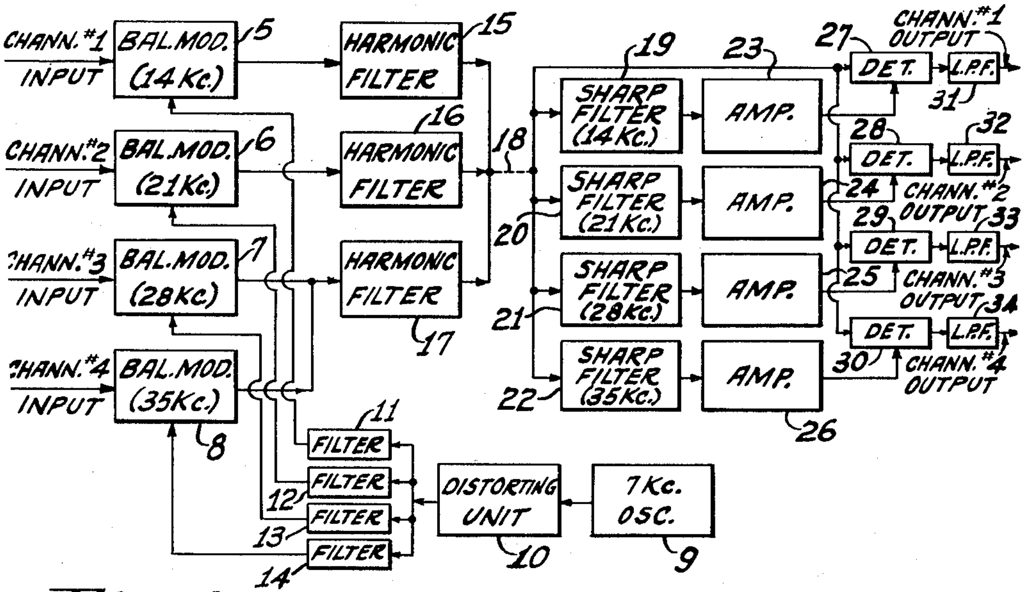
Figure 2:
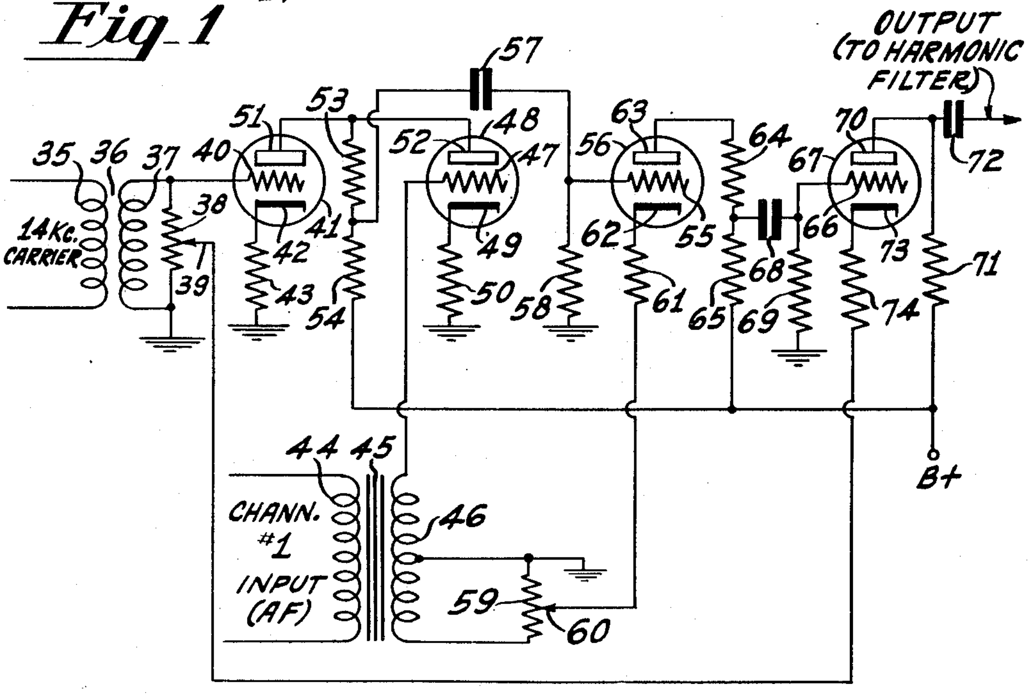

The foregoing and other objects of the invention will be best understood from the following description of an exemplification thereof, reference being had to the accompanying drawing, wherein:

Fig. 1 is a block diagram of a multiplex system in which the modulator of this invention may be used; and Fig. 2 is a diagrammatic representation of a balanced modulator according to this invention.

The objects of this invention are accomplished, briefly, in the following manner:

A balanced modulator corresponding to this invention utilizes a simplified circuit arrangement requiring only two double triodes which need not be matched with each other, and not requiring expensive push-pull input and output transformers which are usually used in a balanced modulator.

Now referring to Fig. 1, the audio frequency input signal of telephone or telegraph channel #1 is applied to a balanced modulator 5, the audio frequency input signal of channel #2 is applied to a balanced modulator 6, the audio frequency input signal of channel #3 is applied to a balanced modulator 7, while the audio frequency input signal of channel #4 is applied to a balanced modulator 8. The modulators 5—8 may be of conventional type, or may be constructed in accordance with Fig. 2, to be later described. An oscillator 9 operating at a frequency below the carrier frequency of the lowest frequency channel to be transmitted, for example at 7 kilocycles, feeds into a distorting unit 10 in order to produce a wave that is rich in harmonics. The second, third, fourth and fifth harmonics of the output frequency of oscillator 9 are fed into corresponding modulators 5, 6, 7 and 8, respectively, as carrier energy therefor, each harmonic being separated from the other harmonics by means of relatively inexpensive narrow band-pass filters 11, 12, 13 and 14. The frequency value given in each of the blocks representing the modulators is the value of the carrier frequency for that particular modulator. The balanced modulators 5—8 are adjusted to permit a small amount of carrier voltage (10 per cent to 20 per cent of normal amplitude) to appear in their outputs, along with both side bands resulting from the modulation process.

The output of each modulator goes through a second inexpensive harmonic filter designed to remove the second, third and higher harmonics of the channel signal which are introduced due to the non-linear characteristics of the modulators. These harmonic filters do not need to have steep sides on their characteristics or response curves. The output of modulator 5 is fed through filter 15, the output of modulator 6 goes through filter 16, while the outputs of both modulators 7 and 8 are fed through filter 17; thus, as shown, two or more channels may be connected to one filter. The outputs of all of the filters 15—17 are connected together in tandem and fed into a broad-band communicating means 18. These filter outputs may be used to modulate a radio transmitter. On the other hand, means 18 may be a wire telephone line, a coaxial cable, a wide-band radio circuit of the type described in my copending application Serial No. 576,453, filed February 6, 1945, or other similar system. Said copending application ripened into Patent #2,514,425 on July 11, 1950.

At the receiving end, the energy transmitted through means 18, containing all channels, goes through two paths. It will be remembered that the transmitted energy consists of, for each channel, the two side bands plus the small amplitude carrier. The first of the two paths consists of the inputs of all of the sharp carrier filter circuits 19, 20, 21 and 22, each of which is designed to pass only the carrier of a corresponding channel, the frequency indicated in each block corresponding to the appropriate carrier frequency of each of the balanced modulators 5—8. The filters 19—22 are similar to the filters 11—14, and may each consist of a very sharply tuned circuit or crystal circuit corresponding to each channel carrier frequency. The output of each of the filters 19—22, which consists of a corresponding carrier, is amplified by a corresponding one of the amplifiers 23—26, to provide for each channel an exalted carrier or a carrier voltage which is large in comparison with any of the signal components from 18. The output of amplifier 23 is fed into a demodulator or detector 27, the output of amplifier 24 feeds into a demodulator or detector 28, the output of amplifier 25 is coupled to a demodulator or detector 29, while the output of amplifier 26 is connected to a demodulator or detector 30. Detectors 27—30 are ordinary amplitude modulation detectors, such as crystal rectifiers, for example.

The second of the two paths through which the energy transmitted through 18 goes consists of the inputs of each of the channel detectors 27—30, to all of which inputs means 18 is directly connected. The complete signal of means 18, consisting of all channels, is applied to each of the detectors 27—30. If the carrier voltage applied to each one of the detectors is exalted or is much higher in amplitude than the composite signal frequencies applied to the detectors, and if the detectors are substantially linear, then the output of each detector 27—30 will contain the audio frequency intelligence of the desired channel plus the beat frequencies produced by the interaction of the carrier with the other undesired channels. These latter frequencies are above the desired audio frequency range, which may extend from 200 to 3,000 cycles, for example, and are eliminated by the low-pass filters 31—34, which follow the detectors 27—30, respectively. Thus, these filters 31—34 eliminate signals from all other channels except from the one having the corresponding exalted carrier applied to its detector. Filters 31—34, which cut off at approximately three kilocycles, are relatively simple and inexpensive. The detectors or demodulators 27—30 operate on the heterodyne principle.

The carrier applied to each detector must be of the proper phase for amplitude modulation detection or demodulation, or to produce proper operation of the detectors 27—30. This proper phasing may be accomplished by a phase adjusting circuit (not shown) or by proper tuning of the carrier filters 19—22.

Single side band multichannel systems require expensive band pass filters at both the transmitter (to eliminate one of the side bands) and the receiver (to select the channel and to prevent interference from other channels). The system of Fig. 1 does not require expensive band-pass filters such as these, all of the filters 11—17 and 31—34 and 19—22 being relatively simple and inexpensive. Thus, simplicity of filtering for the required degree of cross talk between channels results from the use of the system of Fig. 1, if the carrier is restored to the demodulators by being exalted to many times its amplitude during transmission from the transmitter to the receiver.

Since in the system of Fig. 1 both side bands are transmitted, rather than only one as in single side band systems, the former requires about a 30 per cent increase in the modulation frequency range of the system for a given number of channels, but this is not a disadvantage in some applications of microwave relay systems, where a large modulation frequency range can be obtained economically.

Fig. 2 is a schematic diagram of a modulator which may be used in the system of Fig. 1, as any one or as each of the modulators 5—8 of the transmitter. This modulator is here indicated as being modulator 5 of Fig. 1. The carrier voltage of 14 kilocycles is applied to the primary 35 of an input transformer 36 one end of the secondary 37 of which is grounded as shown. A potentiometric resistor 38 having a movable tap 39 thereon is connected across winding 37 for a purpose to be later described. One end of winding 37 is connected to grid 40 of a triode 41 the cathode 42 of which is grounded through a biasing resistor 43; thus, the 14-kilocycle carrier voltage is applied to the grid of tube 41.

The audio frequency input signal of channel #1 is applied to the primary winding 44 of audio transformer 45 which has a center-tapped secondary 46 the center tap of which is grounded as shown. The upper end of winding 46 is connected to grid 47 of a triode 48 the cathode 49 of which is grounded through a biasing resistor 50; thus, the audio modulating voltage is applied to the grid of tube 48. The plate 51 of tube 41 and the plate 52 of tube 48 are connected directly together, and are connected to a positive plate potential source through two series-connected resistors 53 and 54. The negative terminal of the B supply source is grounded.

Because of the described connections, tube 48 amplitude modulates the 14-kilocycle carrier in the plate circuit of tube 41. The amplitude-modulated carrier voltage is then applied to the grid 55 of a triode 56 by means of a connection extending from the common point of resistors 53 and 54 through a coupling condenser 57 to such grid, the R. C. coupling to grid 55 being completed through a resistor 58 connected between said grid and ground.

Also applied to grid 55 will be audio frequency voltage from the plate circuit of modulator tube 48. A potentiometric resistor 59 having a movable tap 60 thereon is connected across the lower half of secondary winding 46, between the lower end of this winding and ground. Tap 60 is connected through a suitable resistor 61 to the cathode 62 of tube 56. In order to supply operating potential to tube 56, plate 63 of this tube is connected to the positive source through two series-connected resistors 64 and 65. The audio frequency voltage from the plate circuit of tube 48, which is applied to grid 55, is balanced out by means of the aforesaid connections, through which an audio frequency voltage of the same phase is applied directly to cathode 62 of tube 56, the magnitude of this voltage being adjustable to the proper value for balance by movement of tap 60. The plate circuit of tube 56 will therefore contain only the 14-kilocycle amplitude-modulated signal.

The amplitude-modulated signal in the plate circuit of tube 56 is applied to the grid 66 of a triode 67 by means of a connection which extends from the common point of resistors 64 and 65 through a coupling condenser 68 to such grid. The R. C. interstage coupling is completed by means of a resistor 69 connected between grid 66 and ground. The plate 70 of tube 67 is connected to the positive potential source through resistor 71, while the modulator output is taken from plate 70 through coupling condenser 72, this output being coupled to the harmonic filters such as filter 15 of Fig. 1. Tap 39 is connected to cathode 73 of tube 67 through a resistor 74, in order to apply unmodulated carrier frequency voltage to such cathode. This unmodulated carrier frequency voltage is of the same phase as the carrier frequency voltage of the amplitude-modulated signal applied to grid 66 of tube 67. As a result, most of the carrier frequency voltage is balanced out of the plate circuit of tube 67, leaving only the side bands and as much of the carrier as desired, such as 10 to 20 per cent, for example. The modulator of Fig. 2 may be made slightly unbalanced, carrierwise, by appropriate adjustment of tap 39 on resistor 38, in order to not balance out all of the carrier frequency in the plate circuit of tube 67, or in the output of the modulator. As much of the carrier frequency as is desired may be caused to appear in the modulator output, by appropriate adjustment of tap 39. According to this invention, as previously described in connection with Fig. 1, the carrier frequencies of the various channels must be propagated from the transmitter to the receiver, in order to demodulate or detect the signals in the proper way to separate the various audio frequency signals from each other.

The modulator of Fig. 2 is considerably less expensive than a modulator of conventional or prior art type, in that no expensive transformers are required.

Although four separate triodes 41, 48, 56 and 67 have been shown in Fig. 2, two double triodes, such as type 6SL7s, may be used if desired to perform the functions of the tubes shown.

What I claim to be my invention is as follows:

1. A modulator circuit, comprising two electron control devices each having an input circuit and an output circuit, means for applying carrier energy to the input circuit of one of said devices, means for applying modulating energy to the input circuit of the other of said devices, means connecting the output circuits of the two devices together to provide a common output circuit, two cascaded electron control devices coupled to said common output circuit, each of said two last-named devices having an input circuit, connections for applying to the input circuit of one of said two last-named devices modulating frequency energy oppositely phased with respect to the modulating frequency energy applied to such input circuit from said common output circuit, and connections for applying to the input circuit of the other of said two last-named devices carrier frequency energy oppositely phased with respect to the carrier frequency energy applied to such input circuit from said common output circuit.

2. A modulator circuit, comprising two electron control devices each having an input circuit and an output circuit, means for applying carrier energy to the input circuit of one of said devices, means for applying modulating energy to the input circuit of the other of said devices, means connecting the output circuits of the two devices together to provide a common output circuit, two cascaded electron control devices coupled to said common output circuit, each of said two last-named devices having an input circuit, connections for applying to the input circuit of one of said two last-named devices a modulating frequency voltage of variable magnitude oppositely phased with respect to the modulating frequency voltage applied to such input circuit from said common output circuit, and connections for applying to the input circuit of the other of said two last-named devices a carrier frequency voltage of variable magnitude oppositely phased with respect to the carrier frequency voltage applied to such input circuit from said common output circuit.

3. A modulator circuit, comprising two electron control devices each having an input circuit and an output circuit, means for applying carrier energy to the input circuit of one of said devices, means for applying modulating energy to the input circuit of the other of said devices, means connecting the output circuits of the two devices together to provide a common output circuit, two electron discharge devices each having at least a control electrode and a cathode, said devices being cascaded by means of their control electrodes and coupled to said common output circuit, connections for applying to the cathode of one of said two discharge devices modulating frequency energy in phase with the modulating frequency energy applied to the control electrode of such one device from said common output circuit, and connections for applying to the cathode of the other of said two discharge devices carrier frequency energy in phase with the carrier frequency energy applied to the control electrode of such other device from said common output circuit.

4. A modulator circuit, comprising two electron control devices each having an input circuit and an output circuit, means for applying carrier energy to the input circuit of one of said devices, means for applying modulating energy to the input circuit of the other of said devices, means connecting the output circuits of the two devices together to provide a common output circuit, two electron discharge devices each having at least a control electrode and a cathode, said devices being cascaded by means of their control electrodes and coupled to said common output circuit, connections for applying to the cathode of one of said two discharge devices a modulating frequency voltage of variable magnitude in phase with the modulating frequency voltage applied to the control electrode of such one device from said common output circuit, and connections for applying to the cathode of the other of said two discharge devices a carrier frequency voltage of variable magnitude in phase with the carrier frequency voltage applied to the control electrode of such other device from said common output circuit.

5. A modulator circuit, comprising two electron control devices each having an input circuit and an output circuit, means for applying carrier energy to the input circuit of one of said devices, means for applying modulating energy to the input circuit of the other of said devices, means connecting the output circuits of the two devices together to provide a common output circuit, two cascaded capacitance-coupled electron discharge devices capacitance-coupled to said common output circuit, each of said two discharge devices having an input circuit, connections for applying to the input circuit of one of said two discharge devices modulating frequency energy oppositely phased with respect to the modulating frequency energy applied to such input circuit from said common output circuit, and connections for applying to the input circuit of the other of said two discharge devices carrier frequency energy oppositely phased with respect to the carrier frequency energy applied to such input circuit from said common output circuit.

6. A modulator circuit, comprising two electron control devices each having an input circuit and an output circuit, means for applying carrier energy to the input circuit of one of said devices, means for applying modulating energy to the input circuit of the other of said devices, means connecting the output circuits of the two devices together to provide a common output circuit, two electron discharge devices each having at least a control electrode and a cathode, said devices being capacitance-coupled in cascade by means of their control electrodes and capacitance-coupled to said common output circuit, connections for applying to the cathode of one of said two discharge devices a modulating frequency voltage of variable magnitude in phase with the modulating frequency voltage applied to the control electrode of such one device from said common output circuit, and connections for applying to the cathode of the other of said two discharge devices a carrier frequency voltage of variable magnitude in phase with the carrier frequency voltage applied to the control electrode of such other device from said common output circuit.

LELAND E. THOMPSON.

REFERENCES CITED

The following references are of record in the file of this patent:

UNITED STATES PATENTS

| Number | Name | Date |
|---|---|---|
| 1,577,722 | Horton | Mar. 23, 1926 |
| 1,593,365 | Scriven | July 20, 1926 |
| 1,690,299 | Horton | Nov. 6, 1928 |
| 2,105,809 | Duncan | Jan. 18, 1938 |
| 2,432,720 | Brown | Dec. 16, 1947 |
| 2,499,568 | Bucker | Mar. 7, 1950 |